(12) United States Patent
Melnik

(10) Patent No.: US 6,496,696 B1
(45) Date of Patent: *Dec. 17, 2002

(54) REAL-TIME CSMA METHOD HAVING THE CAPABILITY TO ADAPTIVELY VARY CELL SIZES AND A WIRELESS NETWORK FOR IMPLEMENTING THE SAME

(75) Inventor: George A. Melnik, Montrose, NY (US)

(73) Assignee: Koninlijke Philips Electronics N.V., Eindhoven (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,140

(22) Filed: Apr. 27, 1999

Related U.S. Application Data

(63) Continuation of application No. 08/733,306, filed on Oct. 17, 1996.

(51) Int. Cl.$^7$ ................................................ H04Q 7/20
(52) U.S. Cl. ..................... 455/446; 455/453; 455/68; 370/315; 370/323
(58) Field of Search ................................ 455/446, 447, 455/453, 522, 68, 69, 561, 562; 370/315, 323

(56) References Cited

U.S. PATENT DOCUMENTS

| | | | |
|---|---|---|---|
| 4,144,411 A | * 3/1979 | Frenkiel | 179/2 EB |
| 4,935,927 A | 6/1990 | Kaewell, Jr. et al. | 370/105.1 |
| 5,193,209 A | 3/1993 | Maeda et al. | 455/34.2 |
| 5,276,907 A | 1/1994 | Meidan | 455/33.3 |
| 5,319,641 A | * 6/1994 | Fridrich et al. | 370/85.3 |
| 5,428,821 A | 6/1995 | Krisna | 455/54.1 |
| 5,465,398 A | 11/1995 | Flammer | 455/69 |
| 5,475,870 A | * 12/1995 | Weaver, Jr. et al. | 455/446 |
| 5,526,355 A | 6/1996 | Yang et al. | 370/85.3 |
| 5,570,343 A | * 10/1996 | Bishop et al. | 455/446 |
| 5,600,651 A | 2/1997 | Molle | 370/448 |
| 5,721,733 A | 2/1998 | Wang et al. | 370/332 |
| 5,742,239 A | 4/1998 | Siloti | 340/825.5 |
| 5,905,714 A | * 5/1999 | Havansi | 370/242 |
| 6,132,306 A | * 10/2000 | Trompower | 455/450 |
| 6,327,245 B1 | * 12/2001 | Satyanarayana et al. | 370/229 |

FOREIGN PATENT DOCUMENTS

| | | | |
|---|---|---|---|
| EP | 0475682 A2 | 5/1991 | H04L/1/56 |
| JP | 3285432 A | 12/1991 | |

OTHER PUBLICATIONS

"Homework Drafting a Consumer Network", by Barclay Brown, OEM Magazine, Apr. 1996.

* cited by examiner

Primary Examiner—Lester G. Kincaid
Assistant Examiner—Tilahun Gesesse

(57) ABSTRACT

A method in which incoming RF signals to a given node of a wireless network are detected in real-time by using a comparison circuit for comparing a signal which is indicative of the strength of an incoming RF signal with a prescribed threshold level. The output of the comparison circuit is coupled to an input of the digital signal processor (e.g., microprocessor) of the node. The microprocessor is preferably programmed to check this input prior to attempting to transmit data thus minimizing the chances of a collision occuring due to overlapping data transmitting and receiving operations. Preferably, the prescribed threshold level utilized in the comparison circuit of a given node can be selectively varied in order to thereby selectively vary the size of the cell in which the given node resides. In this connection, the neighborhood or cell sizes in which the individual nodes in the network reside are preferably adaptively varied in such a manner as to maximize the data throughput of the entire network. Also disclosed is an individual network node for a wireless network and a wireless network which have the capability of implementing the above-described method.

10 Claims, 2 Drawing Sheets

REAL-TIME CSMA METHOD HAVING THE CAPABILITY TO ADAPTIVELY VARY CELL SIZES AND A WIRELESS NETWORK FOR IMPLEMENTING THE SAME

This is a continuation divisional of application Ser. No. 08/733,306, filed Oct. 17, 1996; pending.

BACKGROUND OF THE INVENTION

The present invention relates generally to wireless local area networks (W-LANs), and more particularly, to a real-time carrier sense multiple access (CSMA) method having the capability to adaptively vary cell sizes and a wireless network for implementing the same.

A network which consists of a plurality of network or individual nodes which communicate with each other and with a network control node (also referred to as a "main" or "central" node) via wireless (radio or RF) links is generally referred to as a wireless (radio or RF) network. In wireless, multihop networks, each node includes a node controller which includes a digital signal processing device (e.g., a microprocessor) and an RF transceiver. Data is communicated (transferred) between the individual nodes and the control node by a technique known as "hopping", in which individual units of data are transferred from the control node to a destination node and from an origin (source/sender) node to the control node by being hopped (relayed or retransmitted/rebroadcast) by one or more intermediate nodes in accordance with a network routing protocol, in all instances in which the destination or origin node does not have a direct communication link with the control node. Each of the nodes which hops or relays a packet to one or more other nodes in the network is commonly referred to as a "repeater node". or simply. "repeater". The destination node generally acknowledges receipt of a data packet from the control node by returning an acknowledgement data packet to the control node via one or more repeaters in a similar fashion.

Various logical units of data can be utilized, including packets, frames, or cells. However, for convenience of illustration of a presently preferred embodiment of the present invention, the units of data employed will be "packets" typically ranging in size from about 5–1000 bytes. In this regard, the term "packets" as used herein is intended to encompass all logical units of data, including frames or cells. Generally, packet-hopping data communications are carried out under the control of the control node, which is typically a computer on which resides the data communications control software. The packet-hopping data transfer scheme enables a reduction in the cost of the RF transceivers and compliance with FCC Part 15 requirements.

Such wireless, packet-hopping networks are particularly suitable for controlling one or more functions or systems of a building, e.g.. the lighting, HVAC, and/or security systems of the building, because a wireless network offers a low-cost, indoor communication infrastructure that does not require new lines to be added to the existing structure in order to carry the network information. Further, such networks can support additional systems installed in the building, such as paging and personal communications systems (PCSs).

The control node of such building control networks is typically a building computer. The individual nodes and the building computer run different software programs which are complementary, and which together constitute the system control software. The individual nodes are typically distributed throughout the building to monitor the status/value of prescribed parameters of the building system being controlled, and to produce control signals in response to commands issued by the building computer to adjust the prescribed parameters as required. It is important that the building computer be able to send and receive data to and from each node in the network in order to properly monitor the status/value of the prescribed parameters, and to issue commands to adjust the status/value of the prescribed parameters as required, in accordance with the system control software.

An exemplary building control network is an automatic or intelligent lighting control system which monitors lighting levels, occupancy status, energy consumption as a function of time, and/or other lighting parameters of each room and/or area of the building, within the network, i.e., each room and/or area of the building which is equipped with a lighting module(s) linked to a node controller (also referred to as a "wall unit") which includes an RF transceiver, a digital signal processing device (e.g., microcontroller or microprocessor), and control circuitry to signal the lights to change brightness levels. Each lighting module and its associated node controller together constitute a node in the network which is under the control/management of the building computer.

In such an intelligent lighting, control system, each of the lighting modules is preferably individually programmable (e.g., by building occupants), via its associated wall unit, to provide direct control of the setting of the dimming, ballast thereof, and thus, direct control of the lighting level of the lamp(s) thereof. In this regard, each of the nodes includes one or more sensors (e.g., occupancy status, daylight (ambient lighting), and dimming/lighting level sensors) which provide sensor feedback data to the digital signal processing device (e.g., a microprocessor) of the node controller, which is programmed to analyze (process) the sensor feedback data and to generate control signals for adjusting the lighting level of the monitored lamp(s) associated therewith, as required, to achieve the programmed local lighting conditions.

The sensor feedback data is also transmitted by each node in the network to the building computer, when requested by the building computer to do so, or when the local lighting conditions change. The building computer analyzes (processes) the sensor feedback data in accordance with lighting system control software loaded therein, and sends control data (commands) to the individual nodes, as required, in order to adjust the lighting levels of the monitored rooms/areas of the building in accordance with the lighting system control software, e.g., to optimize the energy efficiency of the lighting system, and thereby override the programmed lighting levels provided by the individual lighting modules. Thus, in addition to being individually programmable and being capable of independent operation, the distributed modules are functionally integrated into a single building-wide network under the control of the building computer.

Data communications in such networks are generally between the building computer and the individual nodes, and vice versa, over a common communications channel (i.e., a shared channel). In order to minimize simultaneous transmissions of packets over the common network channel, a channel access protocol is utilized. The most common channel access protocol is the carrier sense multiple access (CSMA) protocol, according to which each node, prior to transmitting a packet, waits for a random delay period, and then senses the channel to determine whether it is available ("clear") or unavailable ("busy"). If the channel is sensed to be clear it transmits the packet, and if the channel is sensed to be busy, it waits for another random delay period before sensing the status of the channel again before making a further attempt to transmit the packet.

The microcontroller or microprocessor used in the nodes of wireless networks such as the ones described above to typically have a serial interface which is addressed one byte at a time (i.e., in a byte-wise manner) by the processor itself. Thus, the processor can detect an incoming signal only after an entire byte has been received. As such, true real-time detection of incoming signals is not possible. There will always be a one-byte delay between the time that an incoming signal is received and the time that the incoming signal is detected.

Generally, once the first byte of information has been received, a bit flag is set informing the processor that data is incoming (i.e., is being received). In a topical network operating at 9600 baud, bytes are clocked in at 1 ms intervals, so that a processor having a clock rate of 2 MHz may perform as many as 500 instructions in the 1 ms interval between the time that an incoming signal is received and the time that the incoming signal is detected. If any one of these instructions invokes the transmitter of the RF transceiver of the node to begin transmitting data during, this 1 ms interval, a conflict or collision will occur between the data being transmitted and the data being, received, whether or not the incoming data is intended for the node. Such collisions obviously degrade the data throughput of the network, and thus, constitute a significant drawback of presently available wireless networks.

The term "neighborhood" or "cell" as used herein shall mean the domain which encompasses a given node and all other nodes from which the given node can receive an RF signal having sufficient strength to require the given node to wait for completion of receipt of the RF signal, prior to initiating its own data transmissions, e.g., in accordance with a CSMA protocol. In the presently available wireless networks, the individual nodes in the network are each configured at the time of network installation and initialization to operate within a predefined cell size. Obviously, if the cell size is made too small, the the node can become isolated from the rest of the network, whereas if the cell size is made too large, the data throughput of the network can be significantly degraded by forcing the node to wait even when it could communicate without causing a collision to occur. Thus, the presently available wireless networks lack the capability to actively or dynamically control cell sizes in the network, e.g., under system software control, which constitutes a significant shortcoming of the presently available wireless networks.

Based on the above and foregoing, it can be appreciated that there presently exists a need in the art for a real-time carrier sense multiple access (CSMA) method having the capability to adaptively vary cell sizes, and a wireless network for implementing the same. The present invention fulfills this need in the art.

SUMMARY OF THE INVENTION

The present invention encompasses method in which incoming RF signals to a given node of a wireless network are detected in real-time by using a comparison circuit for comparing a signal which is indicative of the strength of an incoming RF signal with a prescribed threshold level. The output of the comparison circuit is coupled to an input of the digital signal processor (e.g., microprocessor) of the node. The microprocessor is preferably programmed to check this input prior to attempting to transmit data, thus minimizing the chances of a collision occuring due to overlapping data transmitting and receiving operations. In the presently preferred embodiment of the present invention, the output of the comparison circuit is applied to both an interrupt enable pin and an RF channel status sensing input pin of the microprocessor, whereby the microprocessor is programmed to invoke a random delay prior to transmitting or re-transmitting data (in accordance with a CSMA protocol), in response to a logic high level output of the comparison circuit.

In accordance with another aspect of the present invention, the prescribed threshold level utilized in the comparison circuit of a given node is selectively varied in order to thereby selectively vary the size of the cell in which the given node resides. Preferably, the threshold level is automatically controlled in accordance with a prescribed algorithm via network commands issued by the network control node (e.g., building computer) of the network and/or in accordance with a software program which resides in each node. In this connection, the neighborhood or cell sizes in which the individual nodes in the network reside are preferably adaptively varied in such a manner as to maximize the data throughput of the network.

The present invention also encompasses an individual network node for a wireless network and a wireless network which have the capability of implementing the above-described method of the present invention.

BRIEF DESCRIPTION OF THE DRAWINGS

These and various other features and advantages of the present invention will be readily understood with reference to the following detailed description taken in conjunction with the accompanying drawings, in which.

DETAILED DESCRIPTION OF THE INVENTION

In overview, in accordance with the method of the present invention, incoming RF signals to a given node of a wireless network are detected in real-time by using a comparison circuit for comparing a signal which is indicative of the strength of an incoming RF signal with a prescribed threshold level. The output of the comparison circuit is coupled to an input of the digital signal processor (e.g., microprocessor) of the node. The microprocessor is preferably programmed to check this input prior to attempting to transmit data, thus minimizing the chances of a collision occuring due to overlapping data transmitting and receiving operations. Since this is a wireless, packet hopping network, messages hop from node to node along multiple wireless pathways 101. In a presently preferred embodiment of the present invention, the output of the comparison circuit is a TTL signal which is applied to an interrupt input pin of the microprocessor, whereby the microprocessor is programmed to generate an interrupt in response to a logic high level output of the comparison circuit. In the presently preferred embodiment of the present invention, the output of the comparison circuit is also applied to a level or RF channel status sensing input pin of the microprocessor, whereby the microprocessor is programmed to invoke a random delay prior to transmitting or re-transmitting data (in accordance with a CSMA protocol), in response to a logic high level output of the comparison circuit.

In accordance with another aspect of the present invention, the prescribed threshold level utilized in the comparison circuit of a given individual node is adaptively variable in order to enable the size of the cell in which the given node resides to be adaptively varied. Preferably, the threshold level is automatically controlled in accordance with a prescribed algorithm via network commands issued by the network control node (e.g. building computer) of the network and/or in accordance with a software program which resides in each node. In this connection, the neighborhood or cell sizes in the network are adaptively varied in such a manner as to maximize the data throughput of the entire network.

Figure 1:
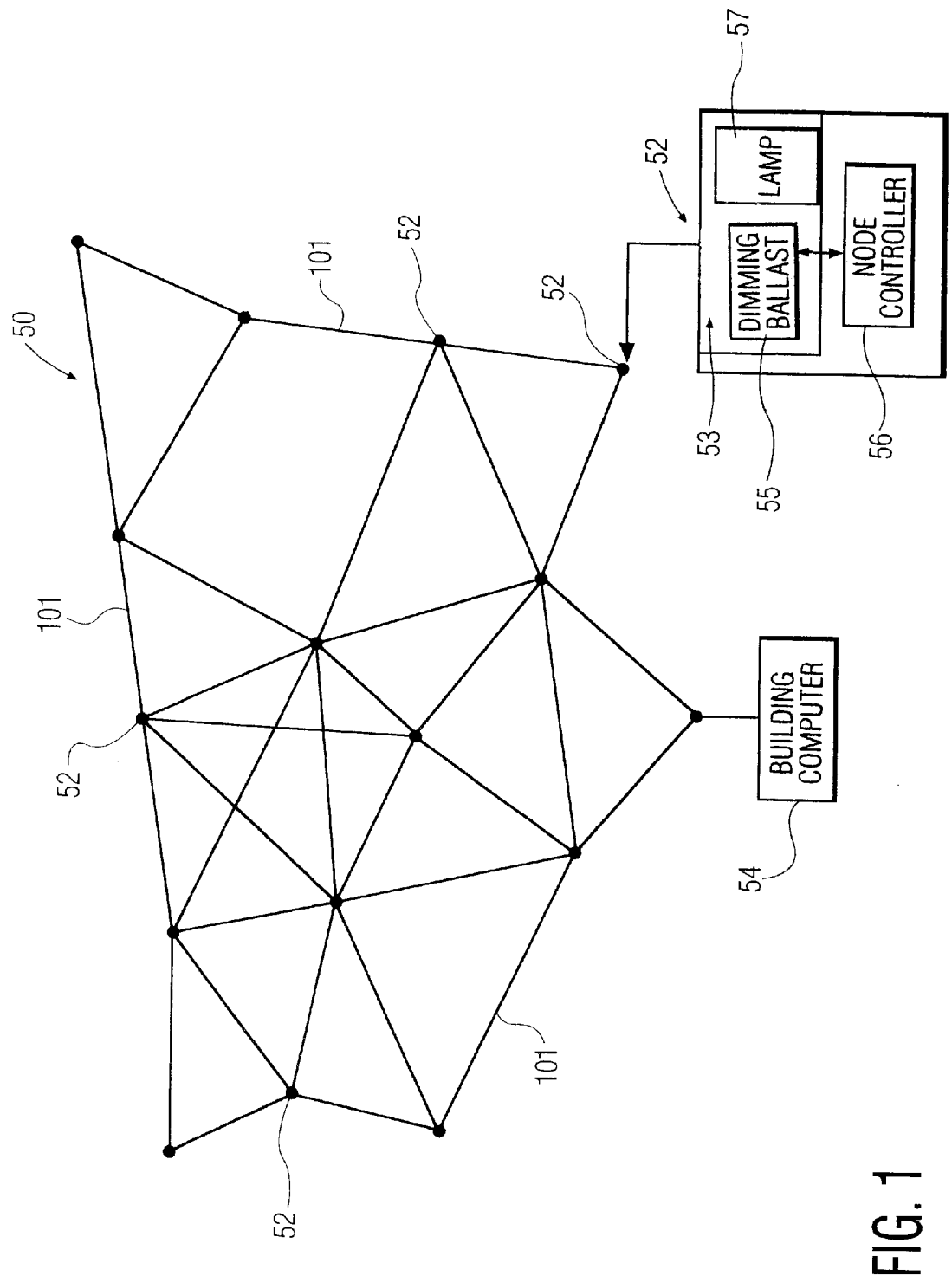
FIG. 1 is a diagrammatical representation of an illustrative wireless network (intelligent lighting control system for a building) which can be used in the practice of the present invention.

The present invention will now be described in greater detail with respect to the illustrative wireless network 50 depicted in FIG. 1, for the sake of simplicity and ease of illustration of the present invention. In the presently preferred embodiment, the network 50 is configured as an intelligent lighting control system for a building. The network 50 includes a plurality of individual nodes 52 and a building computer (network control node) 54. Each of the individual nodes 52 preferably includes a lighting module(s) 53 and a node controller 56 coupled to the lighting module(s) 53. The lighting module(s) 53 of each node 52 preferable includes a dimming ballast 55 and a lamp(s) 57 driven by the dimming ballast 55.

Figure 2:
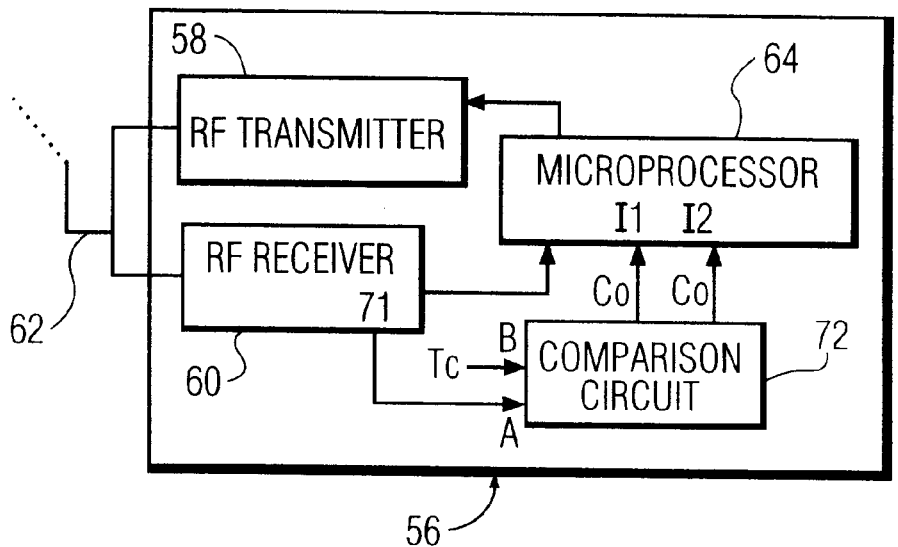
FIG. 2 is a block diagram of the node controller of an individual network node which embodies one aspect of the present invention, and, FIG. 3 is a block diagram of a presently preferred embodiment of the comparison circuit of the node controller depicted in FIG. 2.

As can be seen in FIG. 2, the node controller 56 of each node 52 preferably includes an RF transmitter 58 and an RF receiver 60 commonly coupled to an RF antenna 62, and a microprocessor 64 (or other suitable digital signal processing device) coupled to both the RF transmitter 58 and the RF receiver 60. The RF transmitter 58 and the RF receiver 60 are typically provided together as an integrated component. i.e., as an RF transceiver.

In accordance with the present invention, the node controller 56 of each node 52 further includes a comparison circuit 72 which has a first input A coupled to an output 71 of the RF receiver 60 which is indicative of the strength of an incoming RF signal e.g., an RF signal transmitted by a nearby node, and a second input B coupled to a threshold compare signal Tc which has a prescribed voltage level.

The output 71 of the RF receiver 60 is preferably a signal which is indicative of the strength or relative strength of any incoming RF signal (i.e., any RF signal within its "listening" range) whose carrier frequency is the same as the operating frequency of the shared-channel of the network 50. For example, the Receive Signal Strength Indicator (RSSI) signal generated by the frequency synthesizer of a typical RF receiver can be utilized. In general, the voltage level of the RSSI signal increases linearly with increasing carrier strength, e.g., to a saturation level of 5V for a receiver input level of around −30 dB.

The threshold compare signal Tc preferably has a prescribed voltage level which can be selectively varied by the microprocessor 64 in accordance with a software program which resides on the microprocessor 64 and/or in accordance with network commands issued by the building computer 54, for reasons which will become fully apparent hereinafter.

The output signal Co of the comparison circuit 72 is preferably applied to both a first input pin I1 and a second input pin I2 of the microprocessor 64. The first input pin I1 of the microprocessor 64 is preferably an interrupt enable pin, and the second input pin I2 of the microprocessor 64 is preferably an RF channel status sensing pin. The output signal Co of the comparison circuit 72 is preferably a TTL signal which has a first logic level (e.g., logic high level) when the voltage level of the RSSI signal exceeds the prescribed threshold level (i.e. the voltage level of the threshold compare signal Tc), and a second logic level (e.g., logic low level) otherwise.

Thus, when the strength of the incoming RF signal received by the RF receiver 60 exceeds a prescribed level, a comparator output signal Co having the logic high level is produced, thereby enabling the first input pin I1 of the microprocessor 64 and causing an interrupt to be generated. The interrupt is preferably generated on the positive-going (leading) edge of the comparator output signal Co in case the microprocessor 64 is "idle", to thereby provide a real-time indication to the microprocessor 64 that input data is pending The microprocessor 64 is programmed to check the status of the second input pin I2 prior to transmitting data (i.e., prior to invoking, the RF transmitter 58 to transmit data). If the second input pin I2 is enabled (i.e., the comparator output signal Co is at its logic high level), a random time delay is invoked prior to making a further attempt to initiate the data transmission, in accordance with the CSMA protocol.

This additional microprocessor input I2 is required because most low-cost control microprocessors (i.e., microcontrollers) are not capable of nested interrupt calls. Thus, if the microcontroller of a given node has already invoked a transmission interrupt routine, it will not sense the receive interrupt generated at input I1 until completion of its transmission. Therefore, once the transmission packet has been formulated, a check of input pin I2 prior to initiating the actual RF transmission will further eliminate the possibility of unwanted collisions.

Because the logic level of the comparator output signal Co applied to the second input pin I2 of the microprocessor 64 provides a real-time indication of whether or not incoming data is being received by the RF receiver 60, the probability of unwanted collisions due to overlapping data receiving and transmitting operations is minimized, even in the case where a data transmission has just been initiated by a nearby node (i.e., the first full byte has not been received yet), thereby avoiding the problem with presently available systems described hereinabove.

In the presently preferred embodiment of the present invention, the voltage level of the threshold compare signal Tc is preferably automatically adaptively varied by the microprocessor 64 in accordance with a prescribed algorithm via network commands issued by the building computer 54 and/or in accordance with a software program which resides in each node 52. In this way, the strength of the incoming RF signal received by the RF receiver 58 (e.g., as measured by the RSSI signal) which is required to enable the interrupt input pin I1 and the level sensing pin I2 of the microprocessor 64 can be adaptively varied. By thus varying the "sensitivity" of the associated node 52 to incoming RF signals, the effective size of the neighborhood or cell in which that node resides can be selectively (adaptively) varied.

In this connection, increasing the voltage level of the threshold compare signal Tc used by the comparison circuit 72 to generate the comparator output signal Co effectively reduces the cell size of that node, and decreasing the voltage level of the threshold compare signal Tc used by the comparison circuit 72 to generate the comparator output signal Co effectively increases the cell size of that node. Otherwise stated, increasing the voltage level of the threshold compare signal Tc of the comparator circuit 72 of a given node 52 decreases the number of other nodes whose transmissions still have sufficient signal strength to trigger the microprocessor 64 of that node to delay a data transmission, whereas decreasing the voltage level of the threshold compare signal Tc of the comparator circuit 72 of a given node 52 increases the number of other nodes whose transmissions will have sufficient signal strength to trigger the microprocessor 64 of that node to delay a data transmission.

Figure 3:
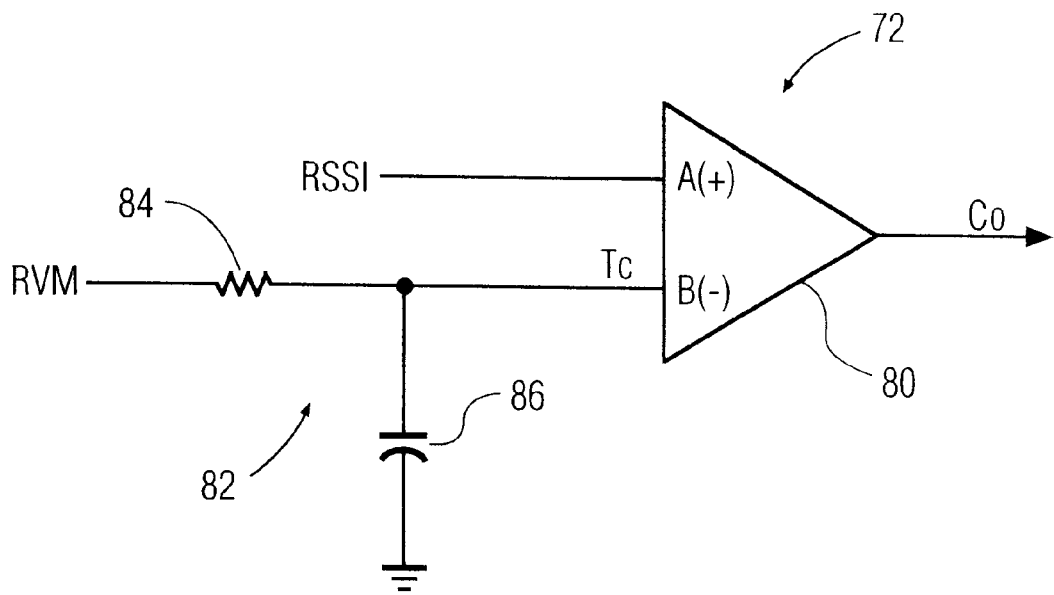

With additional reference now to FIG. 3. there can be seen a presently preferred embodiment of the comparison circuit 72, which includes a comparator 80 whose non-inverting input A is coupled to the RSSI signal from the RF receiver 60, and whose inverting input is coupled to an output end of an RC filter 82 comprised of a resistor 84 and a capacitor 86. The input end of the RC filter 82 is preferably coupled to a pulse-width modulated (PWM) signal output from the microprocessor 64. The RC filter 82 is sized (i.e., the R and C values are set) such that the frequency of the PWM signal is converted to a stable DC voltage, which serves as the threshold compare signal Tc. In this connection, since the purpose of the RC filter 82 is to supply a stable DC comparison voltage, the response rate of the RC filter 82 is not a constraint, and thus, the capacitor 86 can have a large capacitance value C and the frequency of the PWM signal can be low. The microprocessor 64 of a given node 52, under the control of a software program resident therein and/or under the control of network commands issued by the building computer 54, selectively (adaptively) varies the pulse-width of the PWM signal and thereby, the voltage level of the threshold compare signal Tc produced by the RC filter 82, in such a manner as to selectively (adaptively) increase or decrease the size of the cell in which the given node resides. Preferably, the cell sizes are adaptively varied in such a manner as to maximize the data throughput of the network 50 by maximizing the number of pathways 101 without isolating the nodes 52.

It will be readily evident to those skilled in the pertinent art that other techniques for generating a variable threshold compare signal can be utilized in the practice of the present invention. For example, an output compare (OC) timer can be used to automatically toggle an OC output pin of the microcprocessor 64 in such a manner as to produce a PWM signal, or a resistive divider network can be used to produce the variable threshold compare signal Tc. Alternatively, a digital comparator can be utilized with digital threshold compare and RSSI signals or their equivalents.

Although the present invention has been described in detail hereinabove, it should be clearly understood that many variations and/or modifications of the basic inventive concepts taught herein which may appear to those skilled in the pertinent art will still fall within the spirit and scope of the present invention as defined in the appended claims.

What is claimed is:

1. A network node that is configured for use in a wireless packet-hopping network that includes a plurality of network nodes and at least one control node, comprising:
   a transceiver,
   a threshold comparator that is configured to compare a signal strength of a received signal from the transceiver to a threshold level to provide a comparator output signal,
   a controller that is configured to enable transmission of packets from the transceiver based on the comparator output signal,
wherein:
   the controller is further configured to:
      receive one or more commands from the at least one control node, and
      adjust the threshold level based on the commands from the at least one control node, and
   the controller is further configured to enable reception of packets by the transceiver based on the comparator output signal,
   the network node further including
      a dimming ballast that is configured to control a lamp, and
wherein
   the controller is further configured to control the dimming ballast based on information contained in one or more packets.

2. The network node of claim 1, wherein
the controller is further configured to retransmit one or more of the packets, based on a destination address within the one or more packets.

3. The network node of claim 1, wherein
the controller is further configured to delay the transmission of packets from the transceiver by a random delay period.

4. The network node of claim 3, further including
a low-pass filter that is configured to provide the threshold level from the pulse-width-modulated signal.

5. The network node of claim 1, wherein
the controller is further configured to adjust the threshold level based on the signal strength of the received signal.

6. The network node of claim 1, wherein
the controller is further configured to provide a pulse-width-modulated signal that corresponds to the threshold level.

7. A wireless packet-hopping network comprising:
a plurality of network nodes,
   each node being configured to receive packets in dependence upon a comparison of a received signal strength and a threshold level, and
a network controller that is configured to adjust the threshold level of one or more nodes of the plurality of network nodes, so as to control an effective throughput of packets within the network, wherein
the network controller adjusts the threshold level of each of the one or more network nodes so as to enable the node to receive packets from a first set of nodes in proximity to the node, and to disable the node from receiving packets from a second set of nodes that are distant from the node, and
the network controller maintains multiple parallel communication pathways throughout the network by controlling the threshold level of each of the plurality of network nodes.

8. The network of claim 7, wherein
the network is included in a lighting control system for a building.

9. In a wireless, packet-hopping network comprising at least one network control node and a plurality of transceiver nodes, wherein information is transmitted through the network by packet hopping between nodes, an improvement wherein
  at least one transceiver node is capable of
    producing a strength indication signal indicative of a signal strength of an incoming signal,
    comparing the strength indication signal with a threshold compare signal to produce a comparison output signal,
    enabling data transmission based upon the comparison output signal, and
    implementing a cell size adjustment for the individual network node based upon a command received from the at least one network control node, and
  the network is capable of maintaining multiple parallel communication pathways throughout the network based on the cell size adjustment.

10. The network of claim 9, wherein
the at least one network control node effects the cell size adjustment so as to enable the at least one transceiver node to receive packets from a first set of the plurality of transceiver nodes in proximity to the node, and to disable the at least one transceiver node from receiving packets from a second set of the plurality of transceiver nodes that are distant from the at least one transceiver node.

* * * * *